(No Model.)
F. W. MÜLLER.
CONFECTIONER'S ORNAMENTING FUNNEL.
No. 361,312. Patented Apr. 19, 1887.
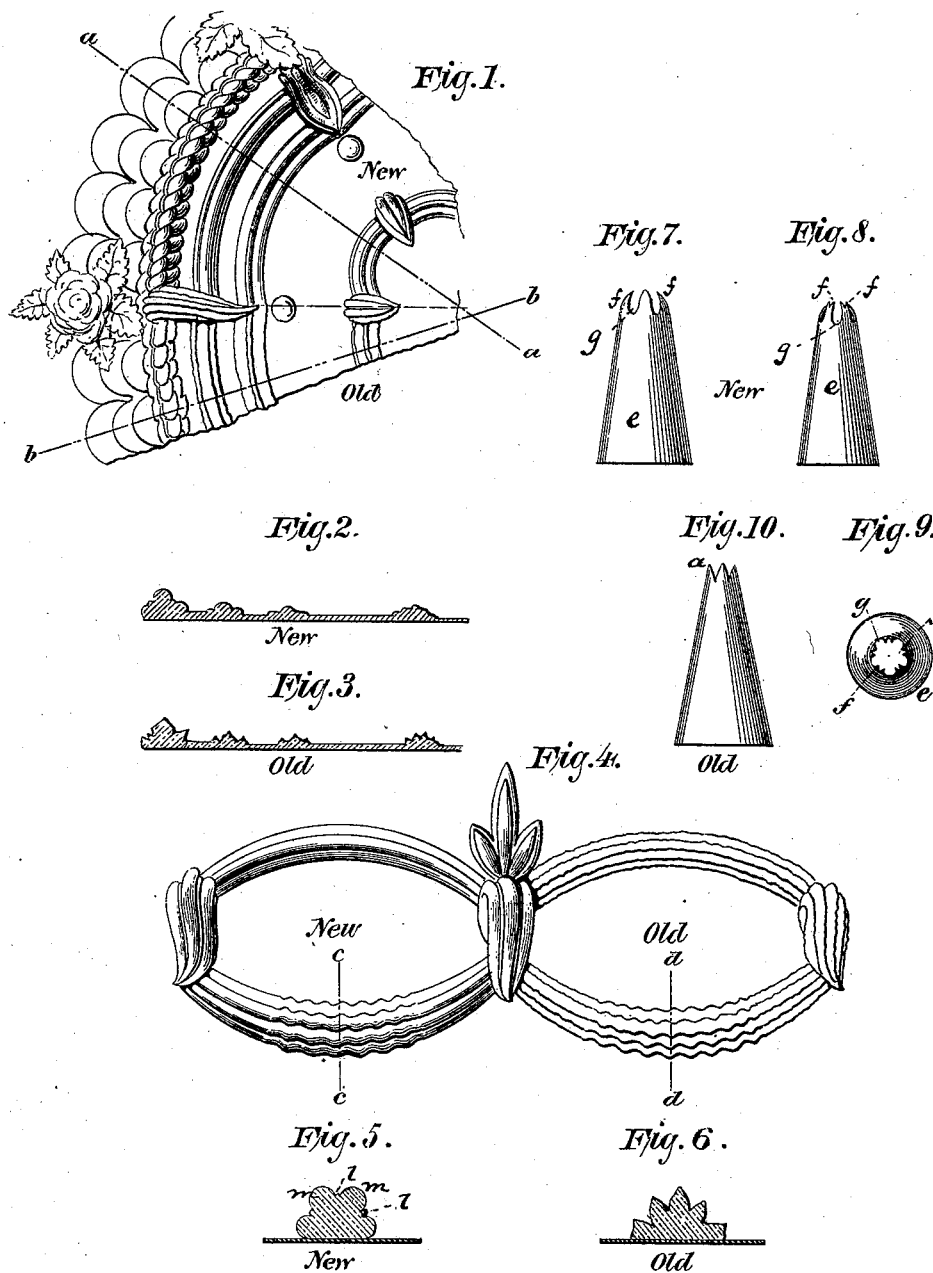

UNITED STATES PATENT OFFICE.

FREDERICK W. MÜLLER, OF NEW YORK, N. Y.

CONFECTIONER'S ORNAMENTING-FUNNEL.

SPECIFICATION forming part of Letters Patent No. 361,312, dated April 19, 1887.

Application filed July 21, 1886. Serial No. 208,611. (No model.)

*To all whom it may concern:*

Be it known that I, FREDERICK W. MÜLLER, a resident of New York city, in the county and State of New York, have invented an Improved Confectioner's Ornamenting-Funnel, of which the following is a full, clear, and exact description, reference being made to the accompanying drawings, in which—

Figure 1 is a diagram or partial top view of an ornamented cake, showing the kind of work to be done by my improved funnel. Fig. 2 is a section of the work done by the improved funnel, and is taken on the line $a\,a$, Fig. 1. Fig. 3 shows the same kind of work made by the funnels previously in use, and is drawn on the line $b\,b$, Fig. 1. Fig. 4 is a top view of an ornament produced in part by the old funnel and part by the new. Fig. 5 is a section on the line $c\,c$, Fig. 4. Fig. 6 is a section on the line $d\,d$, Fig. 4. Fig. 7 shows in side view one of my new funnels. Fig. 8 is a side view of another form of my new funnel. Fig. 9 is a top view of the funnel shown in Fig. 8, and Fig. 10 is a side view of one of the old funnels heretofore in use.

The little funnels to which this invention relates are used by confectioners, bakers, &c., for producing ribbed ornaments on sugar-covered cakes and the like. Such funnels were heretofore made with pointed ends, as in Fig. 10, and were able to produce on a cake only sharp ribs, such as are represented in cross-sections, Figs. 3 and 6. They are objectionable not only because they are incapable of producing rounded ribs, but also, principally, because their points (see $a$, Fig. 10) are aligned with the tapering walls of the funnels, and therefore apt to stick in the cake or to scratch the same, and otherwise deface the sugar-coating which is to be ornamented with its aid.

My invention consists, first, in bending the points of such a funnel inward, as in Figs. 7 and 8, so that they will be no longer in the way and liable to produce disfiguration.

The invention consists, secondly, in rounding the notches between these points, so as to produce rounded ribs.

The invention consists, thirdly, in forking the points so as to produce slight elevations between the rounded ribs, as hereinafter described.

In the drawings, with reference to Fig. 7, the letter $e$ represents my improved funnel. At its smaller end it has the inwardly-projecting points $f$, between which are the rounded notches $g$. Such a funnel when filled with a sugary mixture will cause that mixture to be placed on a cake or other surface to be ornamented, so as to produce the rounded ribs shown in Fig. 2. For increasing the effect, the points $f$ of the funnel may be forked, as in Fig. 8, in which case they produce the light projections $l$ between the rounded ribs $m$, as in Fig. 5. These effects are entirely new and very desirable in the art of ornamenting with sugar or sugary mixtures.

I claim—

1. The confectioner's funnel $e$, made with projecting points $f$ bent inwardly, substantially as herein shown and described.

2. The confectioner's funnel $e$, made with projecting points $f$ bent inwardly, and rounded notches $g$ between said points, substantially as herein shown and described.

3. The confectioner's funnel $e$, made with projecting fingers $f$ bent inwardly and having forked ends, substantially as herein shown and described.

4. The confectioner's funnel $e$, made with projecting fingers $f$, having forked ends and rounded intervening notches $g$, substantially as herein shown and described.

FR. W. MÜLLER.

Witnesses:
CHARLES G. M. THOMAS,
HARRY M. TURK.